United States Patent
Park et al.

(10) Patent No.: US 10,041,568 B2
(45) Date of Patent: Aug. 7, 2018

(54) TRANSMISSION FOR ELECTRIC VEHICLE

(71) Applicant: HYUNDAI MOTOR COMPANY, Seoul (KR)

(72) Inventors: Jong Yun Park, Hwaseong-si (KR); Yeon Ho Kim, Suwon-si (KR); Jae Young Choi, Busan (KR); Kyung Ha Kim, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 377 days.

(21) Appl. No.: 14/943,969

(22) Filed: Nov. 17, 2015

(65) Prior Publication Data
US 2017/0037936 A1    Feb. 9, 2017

(30) Foreign Application Priority Data

Aug. 7, 2015 (KR) .................. 10-2015-0111510

(51) Int. Cl.
*B60W 10/08* (2006.01)
*B60W 10/10* (2012.01)
(Continued)

(52) U.S. Cl.
CPC ..... *F16H 3/089* (2013.01); *F16H 2003/0818* (2013.01); *F16H 2200/0021* (2013.01); *F16H 2200/0039* (2013.01)

(58) Field of Classification Search
CPC ....... B60W 10/08; F16H 61/32; F16H 61/688
(Continued)

(56) References Cited

U.S. PATENT DOCUMENTS 5,582,558 A * 12/1996 Palmeri ................. B60W 10/06
                                                                477/109
5,951,436 A *  9/1999 Kim ..................... B60L 15/2054
                                                                 477/20
(Continued)

FOREIGN PATENT DOCUMENTS

EP          2532546 A1    12/2012
JP       H11170877 A      6/1999
(Continued)

OTHER PUBLICATIONS

Office Action dated Nov. 29, 2016, issued in Korean Patent Application No. 10-2015-0111510.
(Continued)

*Primary Examiner* — Ha Dinh Ho
(74) *Attorney, Agent, or Firm* — McDermott Will & Emery LLP

(57) ABSTRACT

A transmission for an electric vehicle includes an input shaft for receiving power, an output shaft disposed in parallel with the input shaft, a plurality of shift gear units each including external gears connecting the input shaft and the output shaft to each other, a synchromesh system for switching any one of the shift gear units into a power-transmissible state or a non-power-transmissible state between the input shaft and the output shaft, a servo gear unit including a pair of external gears engaged with each other on the input shaft and the output shaft, and a servo clutch adjusting a degree of power transmission between the input shaft and the output shaft by the servo gear unit.

3 Claims, 8 Drawing Sheets

(51) Int. Cl.
*F16H 3/089* (2006.01)
*F16H 3/08* (2006.01)

(58) Field of Classification Search
USPC .................................. 74/335, 325; 477/8, 15
See application file for complete search history.

(56) References Cited

U.S. PATENT DOCUMENTS

| | | | | |
|---|---|---|---|---|
| 6,502,474 | B2 * | 1/2003 | Sakamoto | B60K 6/48 477/181 |
| 6,679,133 | B1 * | 1/2004 | Kayano | F16H 3/12 477/906 |
| 8,437,931 | B2 * | 5/2013 | Asplund | F16H 61/2807 192/3.55 |
| 9,574,638 | B2 * | 2/2017 | Park | F16H 3/093 |
| 2012/0100957 | A1 | 4/2012 | Reitz | |
| 2012/0216638 | A1 | 8/2012 | Pritchard et al. | |

FOREIGN PATENT DOCUMENTS

| | | | |
|---|---|---|---|
| JP | 2002-021997 | A | 1/2002 |
| JP | 2009-121591 | A | 6/2009 |
| KR | 10-1994-0013931 | A | 7/1994 |
| KR | 10-1999-004984 | A | 1/1999 |
| KR | 101282691 | B1 | 7/2013 |

OTHER PUBLICATIONS

Office Action Korean Patent Application No. 10-2015-0111510 dated Apr. 18, 2017.

* cited by examiner

TRANSMISSION FOR ELECTRIC VEHICLE

CROSS REFERENCE TO RELATED APPLICATION

The present application claims the benefit of priority to Korean Patent Application No. 10-2015-0111510, filed Aug. 7, 2015 with the Korean Intellectual Property Office, the entire contents of which is incorporated herein for all purposes by this reference.

TECHNICAL FIELD

The present disclosure generally relates to an automotive transmission. More particularly, the present disclosure relates to a structure of a transmission for an electric vehicle with a motor connected to a transmission input shaft, and a control method thereof.

BACKGROUND

An electric vehicle is equipped with a motor that is electrically driven, and the vehicle is driven by power from the motor.

Such a motor, unlike an internal combustion engine of the related art, outputs high torque up to a relatively high speed period from a low speed period and a vehicle can be driven by controlling the speed and torque of only the motor, but when a transmission is additionally mounted, higher speeds or torque levels can be achieved, as compared with the size and capacity of the motor.

Accordingly, electric vehicles are equipped with a transmission capable of adjusting torque and speed in the process of transmitting power from a motor to driving wheels and the transmission has relatively fewer gears, unlike a transmission that is used with an internal combustion engine in the related art, in order to minimize an increase in weight and cost due to a transmission, reduce the size and weight of a motor, and ensure a speed close to that of vehicles equipped with an internal combustion engine in the related art.

As a transmission mechanism that can be manufactured in a simple configuration at a low cost and can more efficiently transmit power, there is a synchromesh type used in automatic transmissions of the related art, but in this type, torque interruption that completely blocks torque transmitted to an output shaft in shifting is generated, thereby interfering with smooth shifting.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose an automotive transmission that can be manufactured in a simple configuration at a low cost, prevent torque interruption, and provide smooth shifting, thereby improving the commercial value of a vehicle.

In order to achieve the above object, according to one aspect of the present disclosure, there is provided a transmission for an electric vehicle that includes: an input shaft receiving power; an output shaft disposed in parallel with the input shaft; a plurality of shift gear units each including external gears connecting the input shaft and the output shaft to each other to generate different gear ratios; a synchromesh system switching any one of the shift gear units into a power-transmissible state or a non-power-transmissible state between the input shaft and the output shaft; a servo gear unit including a pair of external gears engaged with each other on the input shaft and the output shaft to provide a gear ratio lower than a transmission gear ratio of a shift gear unit having a lowest transmission gear ratio in the shift gear units; and a servo clutch adjusting a degree of power transmission between the input shaft and the output shaft by the servo gear unit.

In the transmission gear units, any one of the external gear on the input shaft and the external gear on the output shaft may not rotate on the corresponding shaft and the other external gear may freely rotate on the corresponding shaft.

The synchromesh system may allow for power transmission between the input shaft and the output shaft by preventing the external gear, which can freely rotate on the corresponding shaft, from rotating on the corresponding shaft.

The shift gear units may be a first shift gear unit having a relatively high transmission gear ratio and a second shift gear unit having a relatively low transmission gear ratio, the first shift gear unit may include a first driving gear not rotating on the input shaft and a first driven gear rotating on the output shaft, the second shift gear unit may include a second driving gear not rotating on the input shaft and a second driven gear rotating on the output shaft, and the synchromesh system may switch the first driven gear and the second driven gear into a rotatable state and a non-rotatable state on the output shaft by two straight strokes in an axial direction of the output shaft.

The servo gear unit may include a servo driving gear rotating on the input shaft and a servo driven gear not rotating on the output shaft, and the servo clutch may be a conical clutch disposed between the input shaft and the servo driving gear to adjust a degree of power transmission between the input shaft and the servo driving gear in accordance with axial displacement of the input shaft.

A motor supplying a driving force to a vehicle may be directly connected to the input shaft.

In order to achieve the above object, according to another aspect of the present disclosure, there is provided a method of controlling a transmission for an electric vehicle that includes: a servo engaging step of engaging a servo clutch to generate friction by means of a controller so that torque is transmitted from an input shaft to an output shaft through a servo gear unit, when a power-on shift instruction to shift from a current engaged gear to a desired gear is given; a shifting-to-neutral step of disengaging a synchromesh system from the current engaged gear by operating the synchromesh system by means of the controller after the servo engaging step; a synchronizing step of synchronizing the synchromesh system with the desired gear by controlling the servo clutch by means of the controller; a desired gear engaging step of engaging the synchromesh system with the desired gear by operating the synchromesh system by means of the controller after the synchronizing step is completed; and a shift completing step of disengaging the servo clutch by means of the controller after the desired gear engaging step.

A transmission gear ratio of the servo gear unit may be smaller than gear ratios of the current engaged gear and the desired gear, and the shifting-to-neutral step may be performed when torque transmitted through the current engaged gear is changed to be transmitted through the servo gear unit by the servo engaging step.

In the synchronizing step, a speed of the input shaft may be synchronized with a desired speed of a motor directly connected to the input shaft by controlling a force operating the servo clutch.

The present disclosure provides a transmission for an electric vehicle that can be manufactured in a simple configuration at a low cost, so it is possible to reduce the size and capacity of a motor that is mounted on the vehicle, and it is possible to reduce the manufacturing cost and improve the fuel efficiency of the vehicle. Further, it is possible to ensure excellent power performance, and particularly, to ensure smooth shifting by preventing torque interruption and shock in shifting, so it is possible to increase the commercial value of a vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
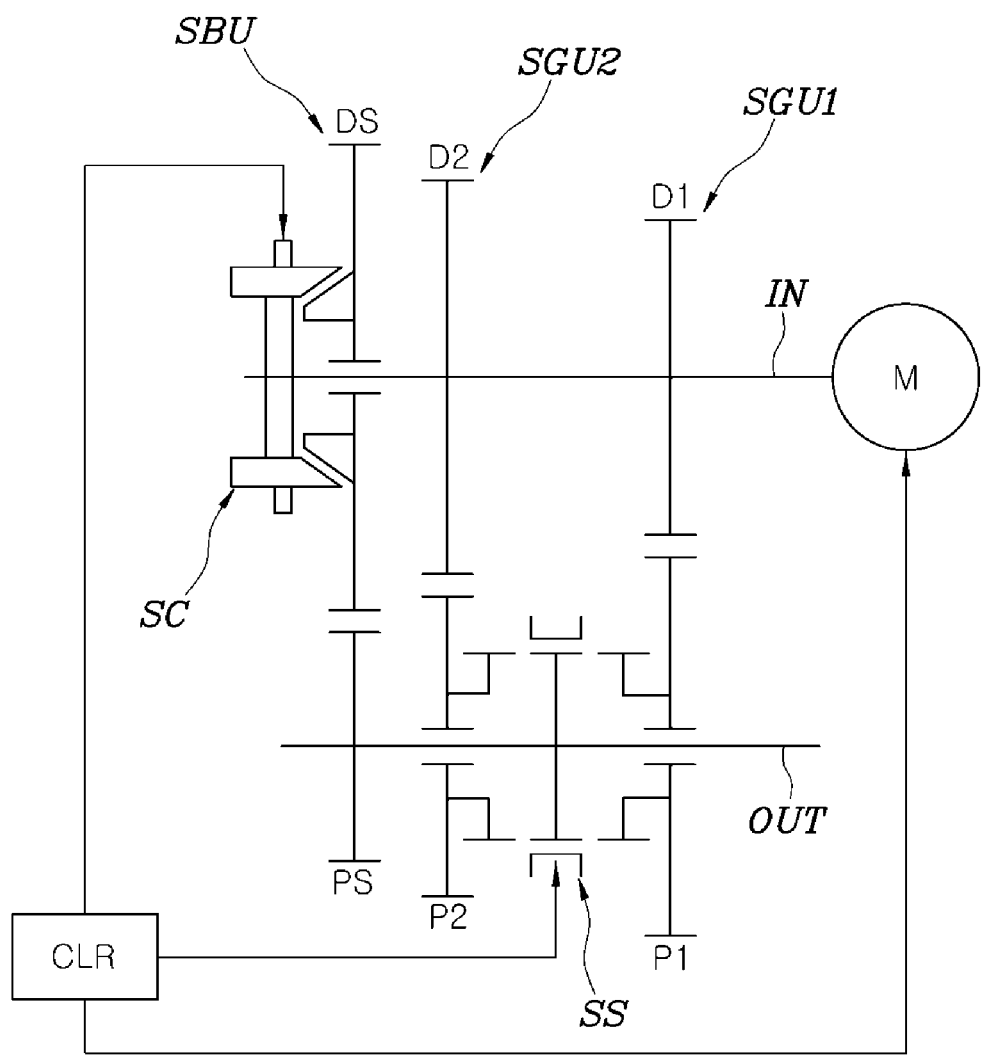
FIG. 1 is a diagram showing the configuration of a transmission for an electric vehicle according to an embodiment of the present disclosure.

Referring to FIG. 1, an embodiment of a transmission for an electric vehicle of the present disclosure may include: an input shaft IN that receives power; an output shaft OUT that is disposed in parallel with the input shaft; a plurality of shift gear units that each include external gears capable of connecting the input shaft and the output shaft to each other to generate different transmission gear ratios; a synchromesh system SS that switches any one of the shift gear units into a power-transmissible state or a non-power-transmissible state between the input shaft and the output shaft; a servo gear unit SBU that includes a pair of external gears engaged with each other on the input shaft and the output shaft to provide a gear ratio lower than the transmission gear ratio of the shift gear unit having the lowest transmission gear ratio in the shift gear units; and a servo clutch SC that can adjust the degree of power transmission between the input shaft and the output shaft by the servo gear unit.

A motor M supplying a driving force to a vehicle is directly connected to the input shaft IN, and the motor M, the synchromesh system SS, and the servo clutch SC can be controlled by a controller CR.

In the shift gear units, any one of the external gear on the input shaft and the external gear on the output shaft cannot rotate on the corresponding shaft and the other one can freely rotate on the corresponding shaft.

The synchromesh system SS allows for power transmission between the input shaft and the output shaft by preventing the external gear, which can freely rotate on the corresponding shaft, from rotating on the corresponding shaft.

In the present embodiment, the shift gear units are a first shift gear unit SGU1 having a relatively high transmission gear ratio and a second shift gear unit SGU2 having a relatively low transmission gear ratio, so it can provide a total of two steps of shifting.

The first shift gear unit SGU1 includes a first driving gear D1 not rotating on the input shaft and a first driven gear P1 rotating on the output shaft and the second shift gear unit SGU2 includes a second driving gear D2 not rotating on the input shaft and a second driven gear P2 rotating on the output shaft.

The synchromesh system SS can switch the first driven gear P1 and the second driven gear P2 into a rotatable state and a non-rotatable state on the output shaft by two straight strokes in the axial direction of the output shaft.

That is, the synchromesh system is disposed on the output shaft and can prevent the first driven gear from rotating on the output shaft by engaging a sleeve thereof with a clutch gear integrally connected to the first driven gear, or can prevent the second driven gear from rotating on the output shaft by engaging the sleeve with a clutch gear integrally connected to the second driven gear, or can make a neutral state without both of the first and second driven gears engaged.

Obviously, the synchromesh system may be composed of a synchromesh system for connecting or disconnecting the first driven gear to or from the output shaft and a synchromesh system for connecting or disconnecting the second driven gear to or from the output shaft.

When the first shift gear unit SGU1 and the second shift gear unit SGU2 are configured such that the first driving gear and the second driving gear can rotate on the input shaft and the first driven gear and the second driven gear cannot rotate on the output shaft, the synchromesh system may be disposed on the input shaft to connect or disconnect the first driving gear and the second driving gear to or from the input shaft.

In the present embodiment, the servo gear unit SBU includes a servo driving gear DS that can rotate on the input shaft and a servo driven gear PS that cannot rotate on the output shaft.

The servo gear unit SBU, as described above, provides a gear ratio lower than that of the shift gear unit having the lowest transmission gear ratio in the shift gear units.

That is, in the present embodiment, the servo gear unit has a transmission gear ratio lower than those of the first shift gear unit and the second shift gear unit, so, for example, when the first shift gear unit SGU1 has a transmission gear ratio of 3.3 and the second shift gear unit SGU2 has a transmission gear ratio of 1.8, the transmission gear ratio of the servo gear unit SBU is set to about 1.75.

This configuration is for smoothly moving the sleeve of the synchromesh system into a neutral state without shock, when disengaging the synchromesh system from the current engaged gear, and more accurately, when disconnecting the sleeve of the synchromesh system from the clutch gear of the current engaged gear.

The servo clutch SC is a conical clutch disposed between the input shaft IN and the servo driving gear DS to be able to adjust the degree of power transmission between the input shaft and the servo driving gear in accordance with axial displacement of the input shaft.

Obviously, when the servo driving gear is non-rotatably disposed on the input shaft and the servo driven gear is rotatably disposed on the output shaft, the servo clutch may be a conical clutch disposed on the output shaft to be able to adjust the degree of power transmission between the output shaft and the servo driven gear.

A method of controlling a transmission having the configuration described above, in accordance with the present disclosure, as shown in FIGS. 2A to 5, may include: a servo engaging step (S10) of engaging a servo clutch to generate friction by means of a controller so that torque is transmitted from an input shaft to an output shaft through a servo gear unit, when a power-on shift instruction to shift from the current engaged gear to a desired gear is given; a shifting-to-neutral step (S20) of disengaging a synchromesh system from the current engaged gear by operating the synchromesh system by means of the controller after the servo engaging step; a synchronizing step (S30) of synchronizing the synchromesh system with the desired gear by controlling the servo clutch by means of the controller; a desired gear engaging step (S40) of engaging the synchromesh system with the desired gear by operating the synchromesh system by means of the controller after the synchronizing step is completed; and a shift completing step (S50) of disengaging the servo clutch by means of the controller after the desired gear engaging step.

Obviously, the transmission gear ratio of the servo gear unit SBU is smaller than the gear ratios of the current engaged gear and the desired gear and the shifting-to-neutral step (S20) is performed when torque transmitted through the current engaged gear is changed to be transmitted through the servo gear unit SBU by the servo engaging step (S10).

In the synchronizing step (S30), the speed of the input shaft may be synchronized with a desired speed of a motor directly connected to the input shaft by controlling a force operating the servo clutch.

Behavior of the transmission of the present disclosure in power-on upshift and method of controlling the transmission are described with reference to FIGS. 2A to 2E, and FIG. 4.

Figure 2A:
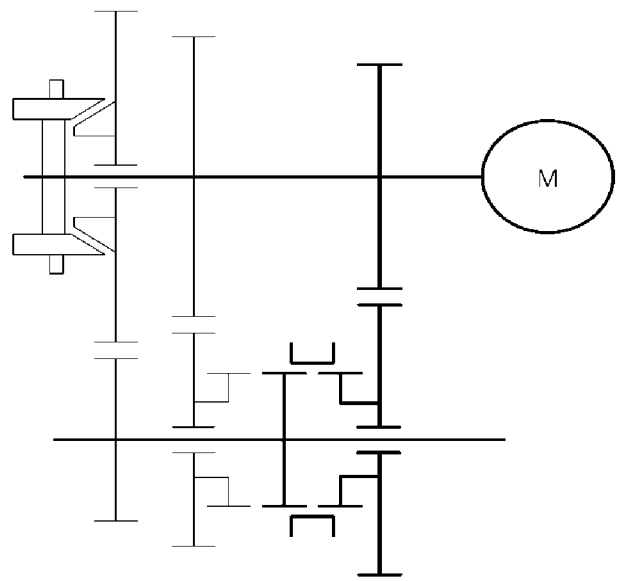
FIGS. 2A to 2E are diagrams illustrating the transmission of FIG. 1 performing power-on upshift.

FIG. 2A shows a state when a vehicle is driven at the first stage, in which power from the motor is changed and transmitted to the output shaft through the first driving gear and the first driven gear, with the synchromesh system preventing relative rotation between the first driven gear and the output shaft by connecting the first driven gear to the output shaft.

Figure 2B:
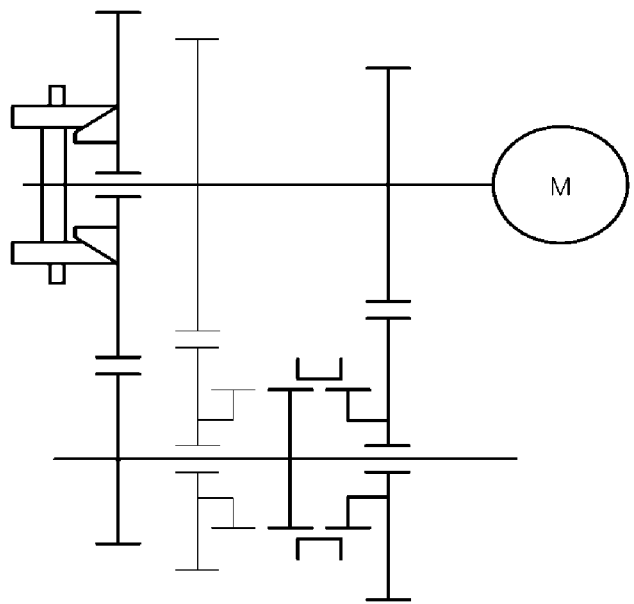

FIG. 2B shows the servo engaging step (S10), that is, when a power-on upshift instruction to shift to an upper gear is given by a driver pressing down an acceleration pedal, the controller controls the servo clutch to generate a friction force.

When friction force is generated by the servo clutch Sc, as described above, the transmission gear ratio of the servo gear becomes smaller than the gear ratio at the first stage, so the torque that has been transmitted from the first driving gear to the first driven gear starts to be gradually transmitted through the servo gear unit and torque is gradually less transmitted between the first driving gear between the first driven gear.

In this state, the controller CLR performs the shifting-to-neutral step (S20) so that the sleeve of the synchromesh system is smoothly disengaged from the clutch gear of the first driven gear without shock or noise.

Figure 2C:
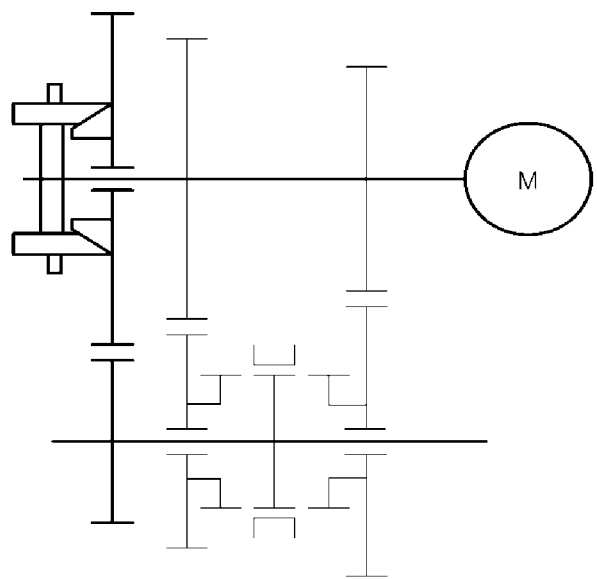
Figure 2D:
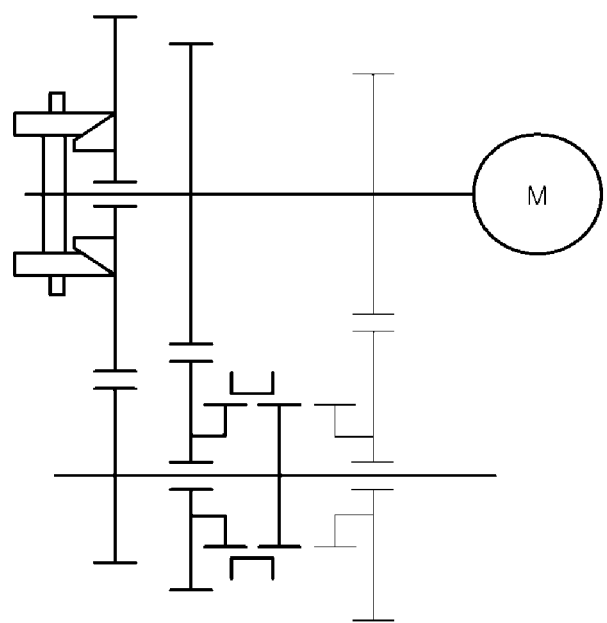

Obviously, since torque from the input shaft is transmitted to the output shaft through the servo gear unit SBU, torque interruption is not generated and torque required for driving the vehicle is continuously transmitted to the output shaft in the transmission, which is shown in FIG. 2C.

Thereafter, the controller CLR performs synchronization by controlling the servo clutch SC. That is, when the speed of the input shaft is synchronized with a desired speed of the motor directly connected to the input shaft, and accordingly, a desired gear and the synchromesh system are synchronized, as in FIG. 2D, the desired gear engaging step (S40) is performed by engaging the sleeve of the synchromesh system with the second driven gear.

Figure 2E:
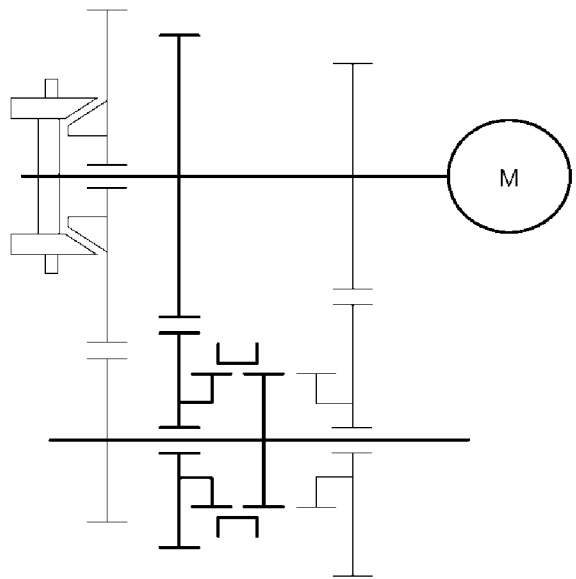

Thereafter, the controller CLR disengages the servo clutch CS, as in FIG. 2E, thereby completing the power-on upshift.

Accordingly, while the synchromesh system is disengaged from the current engaged gear and then engaged with a desired gear, torque interruption that cuts the torque transmitted to the output shaft is prevented. Further, the synchromesh system is smoothly disengaged from the current engaged gear without shock, so shifting is smoothly achieved and the commercial value of a vehicle can be increased.

FIGS. 3A to 3E, and FIG. 5 illustrate power-on downshift of shifting from a second gear that is the current engaged gear to the first gear that is a desired gear.

Figure 3A:
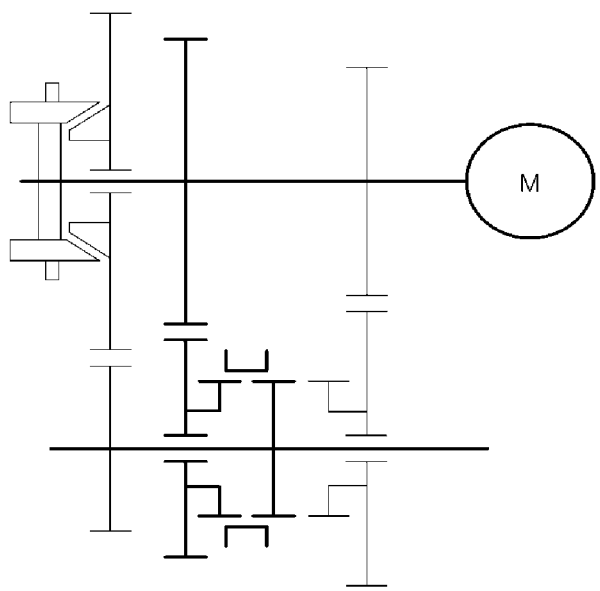
FIGS. 3A to 3E are diagrams illustrating the transmission of FIG. 1 performing power-on downshift.

FIG. 3A shows a state in which a second transmission gear is engaged, in which power from the motor is changed and transmitted to the output shaft through the second driving gear and the second driven gear, with the synchromesh system preventing relative rotation between the second driven gear and the output shaft by connecting the second driven gear to the output shaft.

Figure 3B:
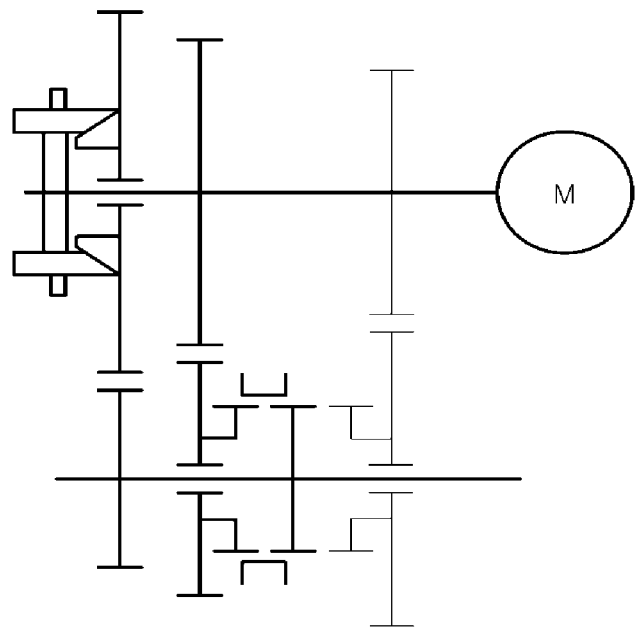

FIG. 3B shows the servo engaging step (S10), that is, when a power-on downshift instruction to shift to a lower gear is given by a driver pressing down an acceleration pedal, the controller CLR controls the servo clutch SC to generate a friction force.

When friction force is generated by the servo clutch Sc, as described above, the transmission gear ratio of the servo gear becomes smaller than the gear ratio at the second stage, so the torque that has been transmitted from the second driving gear to the second driven gear starts to be gradually transmitted through the servo gear unit and torque is gradually less transmitted between the second driving gear and the second driven gear.

In this state, the controller CLR performs the shifting-to-neutral step (S20) so that the sleeve of the synchromesh system is smoothly disengaged from the clutch gear of the second driven gear without shock or noise.

Figure 3C:
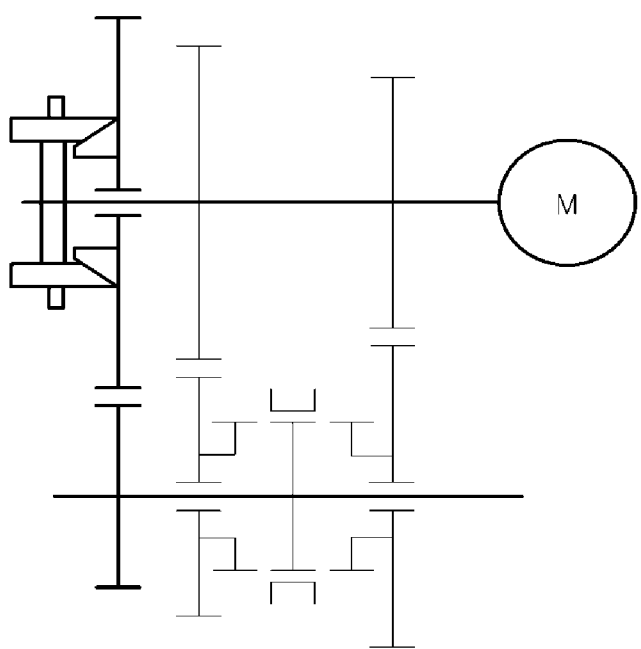
Figure 3D:
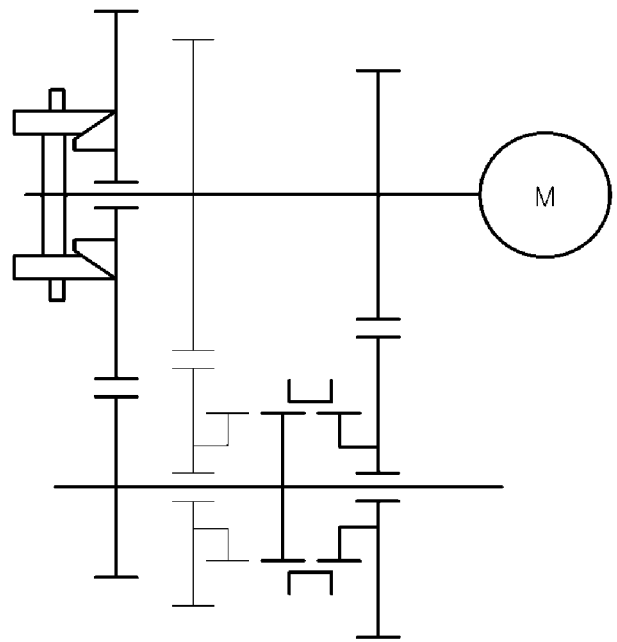

Obviously, since torque from the input shaft is transmitted to the output shaft through the servo gear unit SBU, torque interruption is not generated and torque required for driving the vehicle is continuously transmitted to the output shaft in the transmission, which is shown in FIG. 3C.

Thereafter, the controller CLR performs synchronization by controlling the servo clutch SC. That is, when the speed of the input shaft is synchronized with a desired speed of the motor directly connected to the input shaft, and accordingly, a desired gear and the synchromesh system are synchronized, as in FIG. 3D, the desired gear engaging step (S40) is performed by engaging the sleeve of the synchromesh system with the first driven gear.

The servo clutch Sc is controlled such that the friction force of the servo clutch increases in the servo engaging step before the shifting-to-neutral step, and when the shifting-to-neutral step (S20) is completed and the synchronizing step (S30) is started, the servo clutch Sc is controlled such that the friction force of the servo clutch Sc slightly decreases, so the speed of the input shaft directly connected with the motor increases up to the speed for synchronization with the desired gear to be synchronized.

Figure 3E:
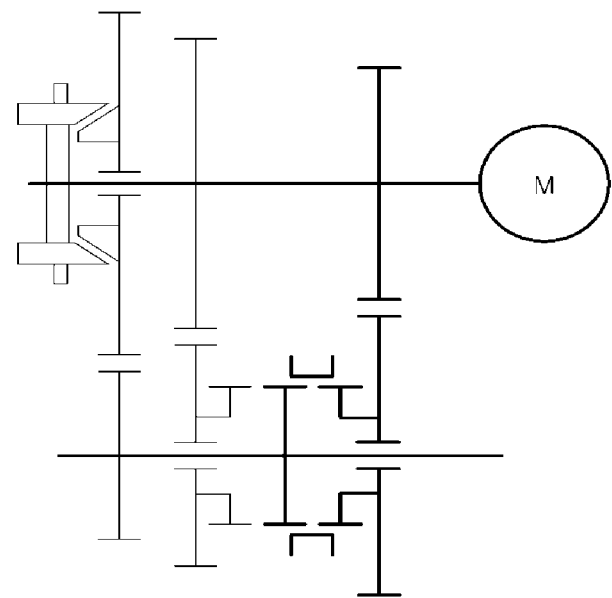
Figure 4:
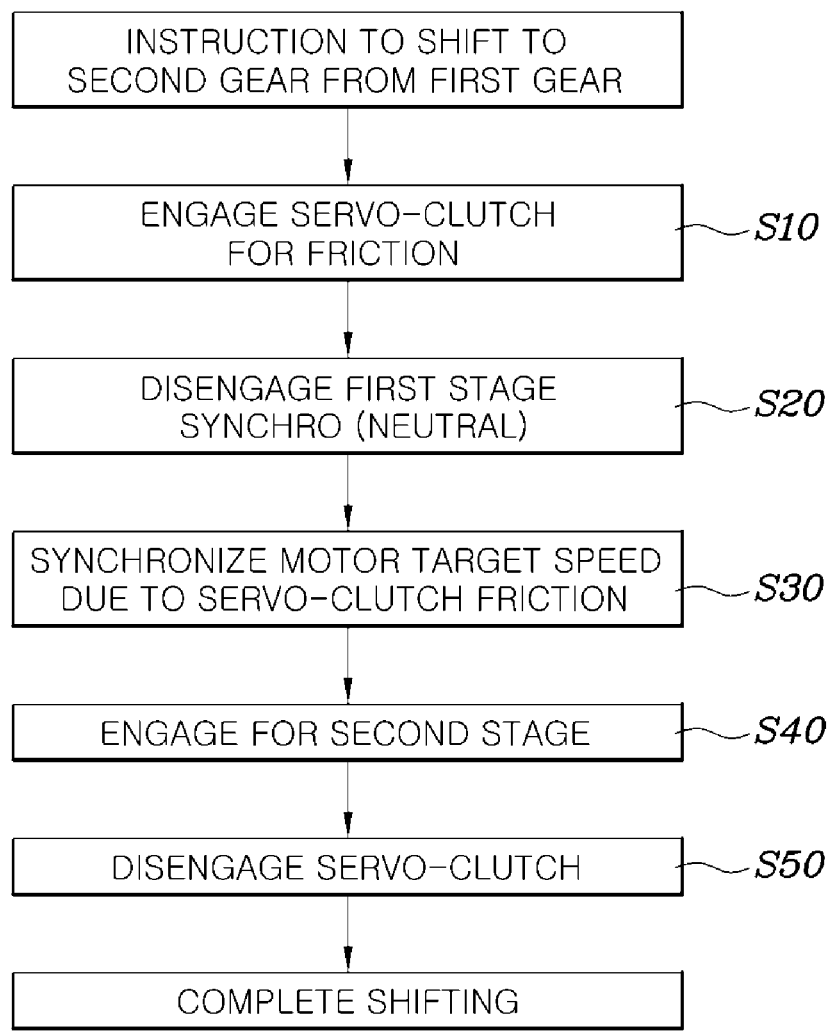
FIG. 4 is a flowchart illustrating an example in which the transmission of FIG. 1 performs power-on upshift.
Figure 5:
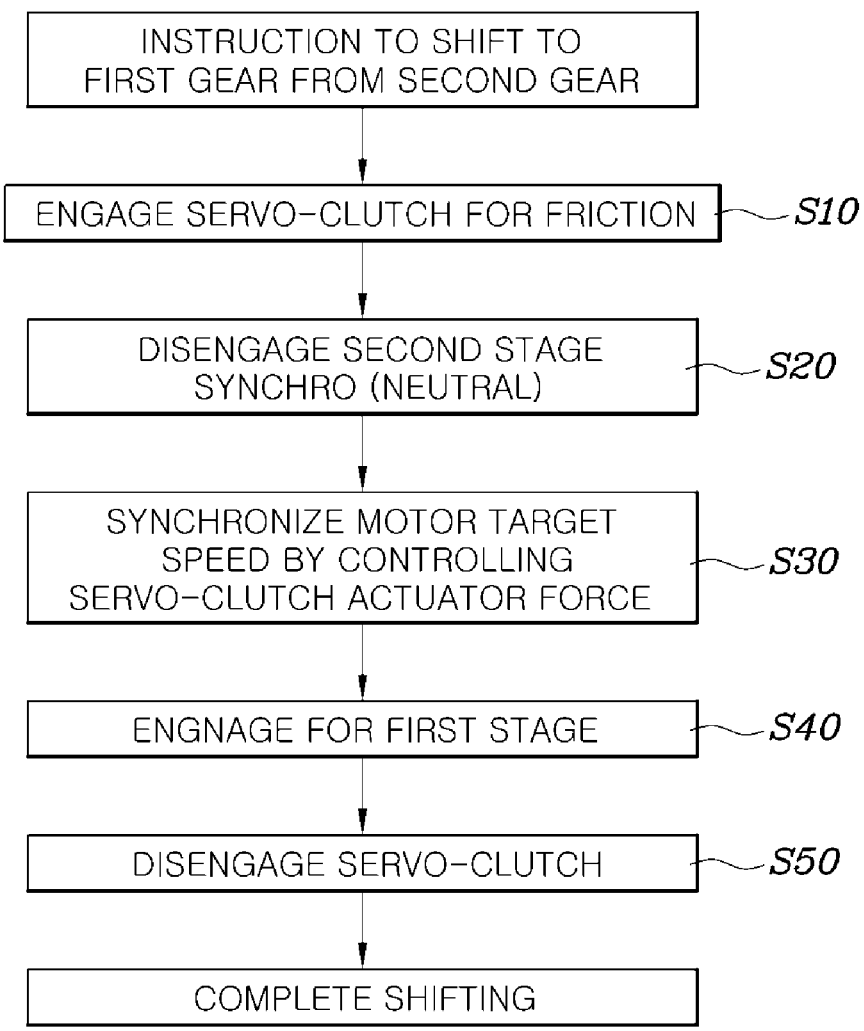
FIG. 5 is a flowchart illustrating an example in which the transmission of FIG. 1 performs power-on downshift.

Thereafter, the controller CLR disengages the servo clutch CS, as in FIG. 3E, thereby completing the power-on downshift.

Accordingly, similar to the power-on upshift, in the power-on downshift, torque interruption that cuts the torque transmitted to the output shaft is prevented. Further, the synchromesh system is smoothly disengaged from the current engaged gear without shock, so shifting is smoothly achieved and the commercial value of a vehicle can be increased.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A method of controlling a transmission for an electric vehicle, comprising:
    a servo engaging step of engaging a servo clutch to generate friction by means of a controller so that torque is transmitted from an input shaft to an output shaft through a servo gear unit when a power-on shift instruction to shift from a current engaged gear to a desired gear is given;
    a shifting-to-neutral step of disengaging a synchromesh system from the current engaged gear by operating the synchromesh system by means of the controller after the servo engaging step;
    a synchronizing step of synchronizing the synchromesh system with the desired gear by controlling the servo clutch by means of the controller;
    a desired gear engaging step of engaging the synchromesh system with the desired gear by operating the synchromesh system by means of the controller after the synchronizing step is completed; and
    a shift completing step of disengaging the servo clutch by means of the controller after the desired gear engaging step.

2. The method of claim 1, wherein a transmission gear ratio of the servo gear unit is smaller than gear ratios of the current engaged gear and the desired gear, and
    the shifting-to-neutral step is performed when torque transmitted through the current engaged gear is changed to be transmitted through the servo gear unit by the servo engaging step.

3. The method of claim 1, wherein in the synchronizing step, a speed of the input shaft is synchronized with a desired speed of a motor directly connected to the input shaft by controlling a force operating the servo clutch.

* * * * *